(12) United States Patent
Meggiolan

(10) Patent No.: US 10,371,219 B2
(45) Date of Patent: Aug. 6, 2019

(54) METHOD FOR MOUNTING A HYDRAULIC BRAKING APPARATUS ON A BICYCLE, HYDRAULIC BRAKING APPARATUS AND MOUNTING TOOL

(71) Applicant: Campagnolo S.r.l., Vicenza (IT)

(72) Inventor: Mario Meggiolan, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/367,570

(22) Filed: Dec. 2, 2016

(65) Prior Publication Data

US 2017/0159731 A1 Jun. 8, 2017

(30) Foreign Application Priority Data

Dec. 4, 2015 (IT) .............................. UB2015A6265

(51) Int. Cl.
| | |
|---|---|
| *F16D 65/00* | (2006.01) |
| *B62L 3/02* | (2006.01) |
| *B25B 27/00* | (2006.01) |
| *B25G 3/00* | (2006.01) |
| *B25H 5/00* | (2006.01) |
| *B62L 1/00* | (2006.01) |
| *F16C 1/26* | (2006.01) |
| *B62J 99/00* | (2009.01) |

(52) U.S. Cl.
CPC ...... *F16D 65/0043* (2013.01); *B25B 27/0071* (2013.01); *B25G 3/00* (2013.01); *B25H 5/00* (2013.01); *B62L 1/00* (2013.01); *B62L 3/023* (2013.01); *F16C 1/26* (2013.01); *B62J 2099/0046* (2013.01)

(58) Field of Classification Search
CPC ........ F16D 65/0043; B62L 3/02; B62L 3/023; B25B 27/00; B25B 27/0071; B25B 27/14; B25B 27/143
USPC ........................................................... 29/278
See application file for complete search history.

(56) References Cited

U.S. PATENT DOCUMENTS

| | | | | |
|---|---|---|---|---|
| 2,036,172 | A | * | 3/1936 | Gagnon ................. A44C 5/185 24/116 A |
| 4,678,360 | A | | 7/1987 | Miller |
| 6,591,461 | B2 | * | 7/2003 | Salentine ................ A45F 5/004 24/115 F |
| 8,251,460 | B2 | | 8/2012 | Veux |

(Continued)

FOREIGN PATENT DOCUMENTS

| | | |
|---|---|---|
| DE | 7927939 U1 | 1/1980 |
| DE | 202009008246 U1 | 10/2009 |

OTHER PUBLICATIONS

Italian Search Report and Written Opinion in Italian Application No. UB2015A006265, dated Aug. 24, 2016, with English translation.

*Primary Examiner* — Thomas J Williams
(74) *Attorney, Agent, or Firm* — Volpe and Koenig, P.C.

(57) ABSTRACT

A method for mounting a flexible tube associated with braking hydraulics on a bicycle between a braking control member and a braking member. The method provides a mounting cable for use in locating the flexible tube within a bicycle frame element while the ends of the flexible tube are exposed so a respective end can be connected to the control member and the braking member. The method simplifies the insertion process and reduces damage to the flexible tube. A tool for inserting the flexible tube is also provided.

11 Claims, 12 Drawing Sheets

(56) References Cited

U.S. PATENT DOCUMENTS

| | | | |
|---|---|---|---|
| 8,365,362 B2* | 2/2013 | Chou | E06B 9/262 160/178.1 R |
| 2002/0149258 A1 | 10/2002 | Lew | |
| 2012/0204658 A1 | 8/2012 | Mercat et al. | |
| 2012/0273308 A1* | 11/2012 | Uchida | F16L 33/224 188/72.4 |
| 2014/0034174 A1 | 2/2014 | Kariyama et al. | |
| 2014/0034428 A1 | 2/2014 | Kariyama et al. | |
| 2014/0034429 A1 | 2/2014 | Kariyama et al. | |
| 2014/0038757 A1* | 2/2014 | Kariyama | B60T 17/043 474/101 |
| 2014/0071971 A1* | 3/2014 | Kojima | H04W 40/02 370/338 |
| 2014/0318307 A1* | 10/2014 | Kariyama | F16C 1/102 74/502.4 |
| 2015/0210347 A1 | 7/2015 | Chen et al. | |

* cited by examiner

METHOD FOR MOUNTING A HYDRAULIC BRAKING APPARATUS ON A BICYCLE, HYDRAULIC BRAKING APPARATUS AND MOUNTING TOOL

CROSS REFERENCE TO RELATED APPLICATION(S)

This application claims the benefit of Italian Application No. UB2015A006265, filed on Dec. 4, 2015 and incorporated herein by reference as if fully set forth.

FIELD OF INVENTION

The present invention relates to a hydraulic braking apparatus of a bicycle. In particular, the aforementioned bicycle is preferably a racing bicycle.

BACKGROUND

As known, it is now common in bicycles to use hydraulic braking apparatuses, particularly for controlling disc brakes. Disc brakes are often preferred to conventional pad brakes because they can ensure a high braking power and are less subject to problems caused by mud or water.

Typically, a disc brake comprises a caliper fixed on the frame of the bicycle or on the fork and a brake disc mounted on the hub of the wheel; hereinafter, reference will be made in particular to a rear brake and therefore to a caliper fixed on the frame, but what is disclosed must also be deemed to refer to a front brake and therefore to a caliper fixed on the fork. Inside the caliper there are two opposite jaws, provided with two respective friction packings (also simply called pads). The brake disc rotates inside the space defined between the two jaws. By actuating the brake lever, the jaws are brought towards the brake disc, generating friction between the brake disc and the pads and, consequently, braking the wheel.

In the present description, the expression "hydraulic braking apparatus" will be used to indicate a apparatus comprising a control member (including a brake lever), a braking member (including a brake caliper) and a flexible tube for adducing braking liquid between said control member and said braking member.

In particular, the braking member comprises a hydraulic chamber included in the aforementioned caliper and the control member comprises a hydraulic chamber actuated by the aforementioned brake lever.

The two hydraulic chambers are in liquid communication with each other through the flexible tube, so that by actuating the brake lever action is applied on the liquid contained in the hydraulic chamber of the control member and consequently also on the liquid contained in the hydraulic chamber of the braking member, so that the jaws are brought towards the brake disc.

The flexible tube can be arranged inside an internal cavity, provided in a bearing element of the bicycle, which can be the frame of the bicycle (for the rear brake) or the front fork (for the front brake). The internal cavity is for this purpose provided with an inlet opening and with an outlet opening for the flexible tube.

In the mounting of the hydraulic braking apparatus on the bearing element (frame or fork) of the bicycle it is thus necessary to make the flexible tube pass through the internal cavity between the inlet opening and the outlet opening.

In the prior art, generally the following occurs.

The control member is fixed to the handlebars of the bicycle and the braking member is fixed to the bearing element of the bicycle. The flexible tube is released both from the control member and from the braking member; a first free end thereof is intended to be connected to the control member, whereas a second free end thereof is intended to be connected to the braking member.

One of the free ends of the flexible tube is inserted into the inlet opening of the internal cavity and the tube is pushed inside the internal cavity. The second free end of the flexible tube thus advances inside the internal cavity, arriving as far as at the outlet opening.

At this point, the operator who carries out the mounting takes care of extracting the second free end of the flexible tube from the outlet opening, possibly with the help of some suitable tools (a screwdriver, a pointed tool, a slipknot, etc.).

The free ends of the flexible tube are then connected to the control member and to the braking member. Alternatively, it is possible that one of the two ends of the flexible tube is connected to the control member or braking member already before the insertion of the flexible tube in the internal cavity.

When the flexible tube has been connected at both ends thereof with the respective members, the apparatus is loaded with the braking liquid, introduced for example starting from the hydraulic chamber of the control member.

The Applicant has observed that the mounting of the hydraulic braking apparatus can be difficult, particularly in the step in which the flexible tube must be extracted from the outlet opening, and depends essentially on the skill of the operator; often, it can take a few attempts before successfully arriving at the extraction and therefore a consequent use of time.

Furthermore, the Applicant has observed that the second free end of the flexible tube can be damaged following the insertion into the internal cavity and the attempts of extraction. Consequently, it may sometimes be necessary to restore the second free end before connecting it to the braking member, for example by cutting—if possible—an end part of the flexible tube.

The technical problem at the basis of the present invention is therefore that of reducing the mounting time of a hydraulic braking apparatus on a bicycle, also making them relatively repeatable for each mounting, even if carried out by different operators or ones with little experience.

SUMMARY

The present invention therefore relates, in a first aspect thereof, to a method for mounting a hydraulic braking apparatus on a bicycle.

Preferred features of the mounting method according to the invention are disclosed herein.

In particular, the present invention relates to a method for mounting a hydraulic braking apparatus on a bicycle, said hydraulic braking apparatus comprising a control member, a braking member and a flexible tube for adducing braking liquid between said control member and said braking member, the bicycle comprising an internal cavity provided with an inlet opening and with an outlet opening for said flexible tube, said method comprising—not necessarily in the order from a) to j)—the following steps:

a) fixing said control member to bicycle handlebars;
b) fixing said braking member to said bearing element of bicycle;
c) connecting a first free end of said flexible tube to one between said control member and said braking member;

d) connecting an opposite second free end of said flexible tube to a mounting tool;

e) providing a mounting cable;

f) coupling the mounting cable to said mounting tool connected to said flexible tube;

g) making said mounting cable pass through the internal cavity of said bearing element between said inlet opening and said outlet opening;

h) pulling said mounting cable, so as to drag said flexible tube through the internal cavity of said bearing element between said inlet opening and said outlet opening;

i) removing said mounting tool from said second free end of said flexible tube;

j) connecting said second free end of said flexible tube to the other between said control member and said braking member.

With this mounting method it is possible to easily mount the flexible tube in the internal cavity. In particular, it is possible to carry out the mounting also in the presence of a very narrow internal cavity, or with very narrow passages, since the bulk that must be made to pass between the inlet opening and the outlet opening of the internal cavity is simply that minimal one of the flexible tube.

It should be noted that the order in which the aforementioned steps are carried out is not necessarily that from a) to j). In particular, while it is preferable that the steps d)-i) be carried out in the order from d) to i), the steps a), b) and c) can be carried out both before and after the steps from d) to i).

Preferably, said step j) is carried out by inserting a plugging portion of said mounting tool in said flexible tube, and said step i) is carried out by extracting said plugging portion of said mounting tool from said flexible tube.

In this way, it is obtained not only the mechanical connection of the mounting tool to the flexible tube, but also the closure of this latter.

Preferably, said step f) is carried out by housing an enlarged head of said mounting cable in a seat formed in a coupling portion of said mounting tool, said seat comprising a transversal abutment wall for the enlarged head.

An easy and secure coupling is thus obtained between the mounting cable and the mounting tool.

Preferably, during said step h) the enlarged head is in abutment on said transversal abutment wall of said mounting tool. This ensures the stability of the coupling during the various mounting steps.

In a first embodiment of the method according to the invention, said step f) is carried out by longitudinally inserting said mounting cable in a through hole of said transversal abutment wall of said mounting tool, until the enlarged head arrives at being housed in said seat.

This solution ensures the maximum structural strength of the mounting tool and excludes any possibility of disengagement of the mounting cable from the mounting tool during the various operations.

In a second embodiment of the method according to the invention, said step f) is carried out by transversally inserting said mounting cable in a substantially radial through slit of said transversal abutment wall of said mounting tool, until the enlarged head arrives at being housed in said seat.

This solution, however, ensures an excellent structural strength of the mounting tool and prevents the disengagement of the mounting cable from the mounting tool during the various operations, whilst still allowing a much simpler and quicker coupling, which does not require the entire length of the mounting cable to be inserted through the through hole.

In an alternative preferred embodiment, said step f) is carried out by inserting the mounting cable in a ring formed in a coupling portion of said mounting tool. This makes it possible to carry out the mounting of the braking apparatus using a simple cable, without enlarged head.

Preferably, the mounting method according to the invention comprises the step of:

k) filling said flexible tube and an inner chamber of said one between said control member and said braking member with braking liquid, wherein the step k) is carried out after said step c) and before said step d).

It is thus possible to provide the installer of the braking apparatus with a apparatus already complete of braking liquid, possibly (and preferably) already tested.

Preferably, the mounting method according to the invention comprises the following steps:

l) filling an inner chamber of said other between said control member and said braking member with braking liquid;

m) thereafter, plugging said inner chamber of said other b said control member and said braking member through a closing element;

n) thereafter removing said closing element and carrying out said step j).

Preferably, the mounting method according to the invention comprises the step of:

o) cutting said flexible tube to the required size for the specific bicycle, this step o) being carried out after said step c) and before said step j).

Preferably, said step g) is carried out with the help of a guide tube predisposed in said internal cavity between said inlet opening and said outlet opening.

The guide tube is sometimes already predisposed at the manufacturing stage of the bearing element of the bicycle, in order to facilitate the mounting of the braking apparatus.

In a second aspect thereof, the present invention relates to a hydraulic braking apparatus to be mounted on a bicycle.

Preferred features of the hydraulic braking apparatus according to the invention are disclosed herein.

In particular, the present invention relates to a hydraulic braking apparatus to be mounted on a bicycle, comprising a control member, a braking member and a flexible tube for adducing braking liquid between said control member and said braking member, said control member comprising fixing members to bicycle handlebars, said braking member comprising a fixing portion to a bearing element (frame or fork) of the bicycle, wherein a first free end of said flexible tube is connected to one between said control member and said braking member, and an opposite second free end of said flexible tube is connected to a mounting tool, said mounting tool comprising a coupling portion to a mounting cable and a plugging portion inserted in said flexible tube.

Preferably, said mounting tool has a transversal bulk substantially equal to or less than a transversal bulk of said flexible tube.

Preferably, said coupling portion of said mounting tool comprises a seat configured for housing an enlarged head of said mounting cable.

Preferably, said seat comprises a transversal abutment wall for the enlarged head of said mounting cable, said transversal abutment wall comprising a through hole configured for being passed through by said mounting cable.

Preferably, said transversal abutment wall comprises a substantially radial through slit, configured for being passed through by said mounting cable.

In an alternative preferred embodiment, said coupling portion of said mounting tool comprises a ring configured for coupling said mounting cable. This makes it possible to couple a simple cable, without enlarged head, to the mounting tool.

Preferably, said plugging portion of said mounting tool comprises a plurality of substantially circumferential indentations. It is thus ensured that there is an adequate hydraulic seal, thanks to the circumferential indentations.

Preferably, said plugging portion of said mounting tool comprises a plurality of substantially radial sectors. This configuration ensures an excellent mechanical seal.

Preferably, the hydraulic braking apparatus according to the present invention comprises a closing element to plug an inner chamber of the other between said control member and said braking member.

Preferably, the hydraulic braking apparatus comprises braking liquid pre-inserted in the flexible tube and in one or both of the control and braking members.

This makes it possible to provide the installer with an apparatus already complete of everything, including the braking liquid, and possibly already tested.

In a third aspect thereof, the present invention relates to a mounting tool of a hydraulic braking apparatus on a bicycle.

Preferred features of the mounting tool according to the invention are disclosed herein.

In particular, the present invention relates to a mounting tool of a hydraulic braking apparatus on a bicycle, comprising a coupling portion for a mounting cable and a plugging portion configured for the insertion in a free end of a flexible tube of said hydraulic braking apparatus.

This tool greatly facilitates the mounting of the braking apparatus, in particular it facilitates the insertion of the flexible tube in the internal cavity.

Preferably, the mounting tool according to the present invention has a transversal bulk substantially equal to or smaller than a transversal bulk of said flexible tube.

In this way, the mounting tool does not introduce the need for wider passage spaces than what is required by the flexible tube.

Preferably, said coupling portion comprises a seat configured for housing an enlarged head of said mounting cable.

Preferably, said seat comprises a transversal abutment wall for the enlarged head of said mounting cable, said transversal abutment wall comprising a through hole configured for being passed through by said mounting cable.

Preferably, said transversal abutment wall comprises a substantially radial through slit, configured for being passed through by said mounting cable.

Preferably, said plugging portion comprises a plurality of substantially circumferential indentations.

Preferably, said plugging portion comprises a plurality of substantially radial sectors.

Preferably, said coupling portion is made on a portion of said mounting tool separable from another portion of said mounting tool where said plugging portion is made.

BRIEF DESCRIPTION OF THE DRAWING(S)

Further features and advantages of the invention will become clearer from the description of preferred embodiments (method, hydraulic braking apparatus and mounting tool) thereof, for the sake of simplicity referring to a rear brake (but clearly also applicable to a front brake), made with reference to the attached drawings, where:

DETAILED DESCRIPTION OF THE PREFERRED EMBODIMENT(S)

Figure 1:
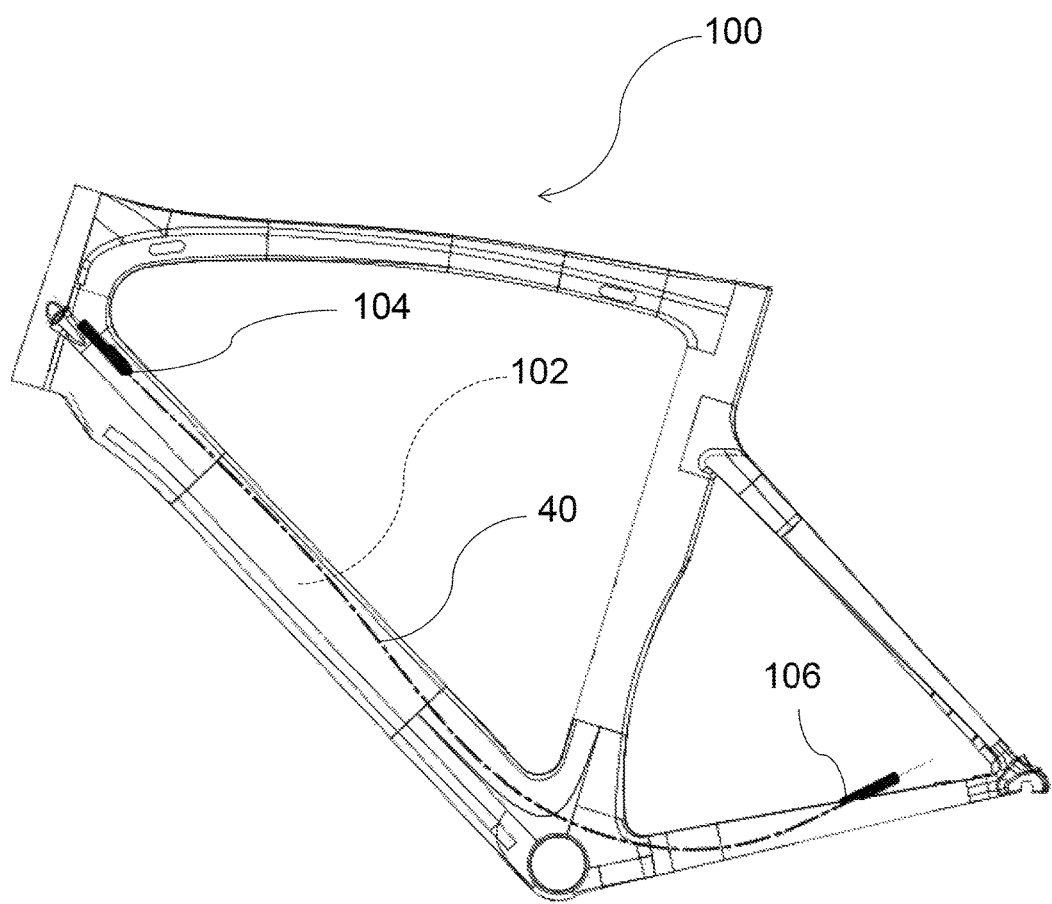
FIG. 1 is a side view of a bearing element (frame) of bicycle wherein the path of a flexible tube of a hydraulic braking apparatus is sketched.

Initially with reference to FIGS. 1, 2, 2a, 4, 5, 11, 13 and 14, reference numeral 10 globally indicates a first embodiment of a hydraulic braking apparatus—of a rear brake—according to the present invention, to be mounted on a bearing element of bicycle, in particular a bicycle frame 100 (FIG. 1), or on a fork (not illustrated) of bicycle in case of front brake.

Figures 2, 2A:
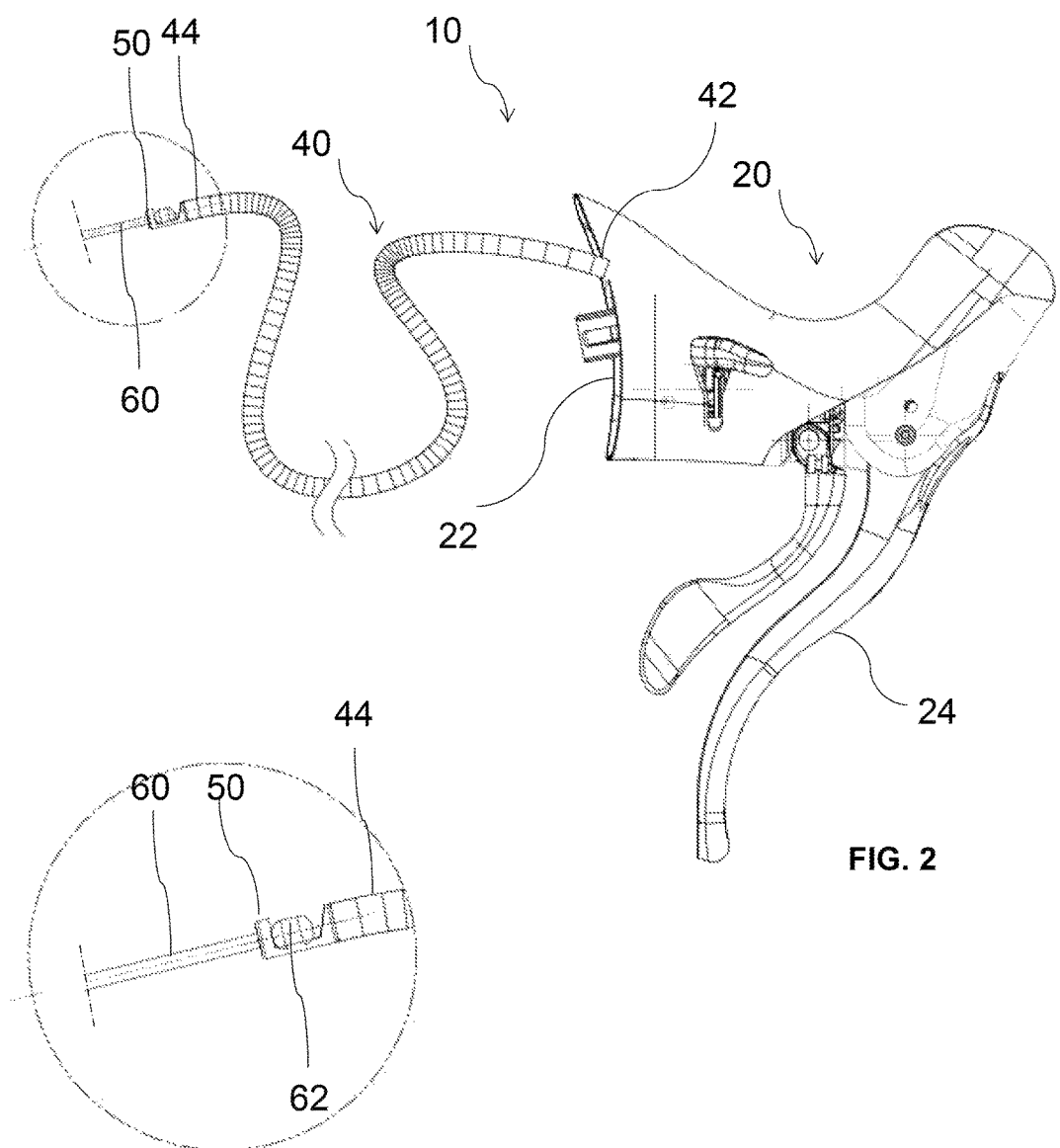
FIG. 2 is a view of a front portion (including a control member and a flexible tube) of a first embodiment of a hydraulic braking apparatus according to the present invention, to be mounted on the bicycle frame of FIG. 1.
FIG. 2a is an enlargement of a part of the hydraulic braking apparatus that is circled in FIG. 2.

The apparatus 10 comprises a control member 20 (FIG. 5), a braking member 30 (FIG. 11) and a flexible tube 40 (FIG. 2). The flexible tube 40 adduces braking liquid between the control member 20 and the braking member 30.

The frame 100 comprises an internal cavity 102 provided with an inlet opening 104 and with an outlet opening 106 for the flexible tube 40. In FIG. 1 the path of the flexible tube 40 inside the internal cavity 102 is schematically sketched.

The control member 20 comprises a fixing portion 22 to bicycle handlebars (not illustrated) and comprises a brake lever 24.

The braking member 30 comprises fixing members, in particular fixing screws 32 to the bicycle frame 100; these fixing screws 32 are per se conventional and are not illustrated in detail.

As illustrated in FIG. 2, a first free end 42 of the flexible tube 40 is connected to the control member 20, whereas an opposite second free end 44 of the flexible tube 40 is connected to a mounting tool 50.

Figure 4:
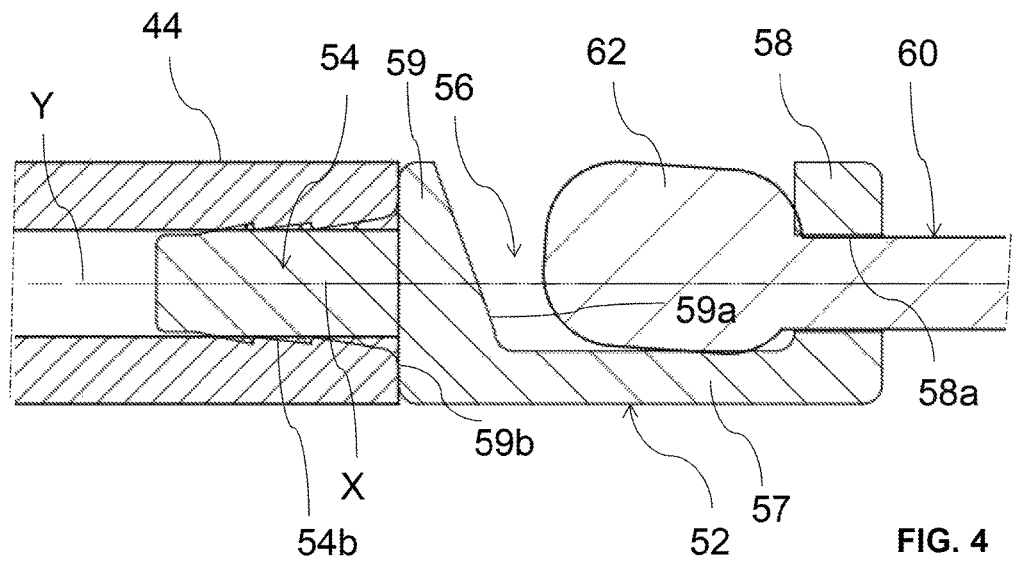
FIG. 4 is a longitudinal section of a first embodiment of a mounting tool according to the present invention, mounted on a flexible tube of the hydraulic braking apparatus of FIG. 2 or 3.
Figure 5:
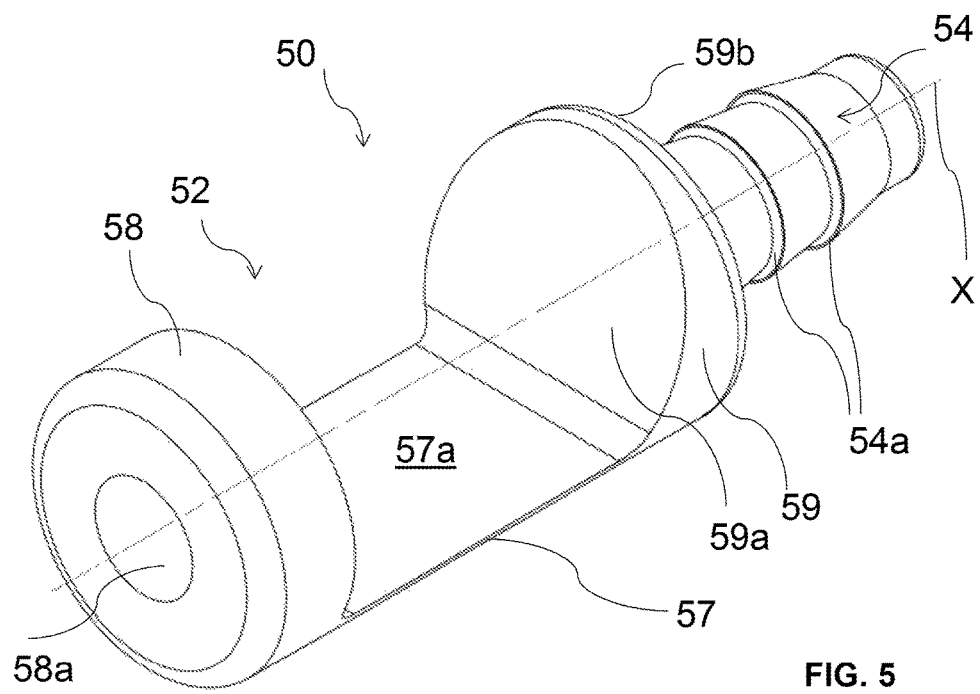
FIG. 5 is a perspective view of the mounting tool of FIG. 4.

In accordance with the present invention, the mounting tool 50 comprises a coupling portion 52 to a mounting cable 60 and a plugging portion 54 inserted in the second free end 44 of the flexible tube 40 (FIGS. 4 and 5).

As illustrated in FIG. 4, the mounting tool 50 has a transversal bulk substantially equal to a transversal bulk of the flexible tube 40. The mounting tool 50 can also have a transversal bulk smaller than that of the flexible tube 40.

The coupling portion 52 of the mounting tool 50 comprises a seat 56 configured for housing an enlarged head 62 of the mounting cable 60.

The seat 56 comprises a transversal abutment wall 58 for the enlarged head 62 of the mounting cable 60.

The transversal abutment wall 58 comprises a through hole 58a configured for being passed through by the mounting cable 60.

The through hole 58a is substantially coaxial to the plugging portion 54, along a longitudinal axis X of the mounting tool 50. The through hole 58a is therefore also coaxial to a longitudinal axis Y of the flexible tube 40, when the plugging portion 54 of the mounting tool 50 is inserted in the second free end 44 of the flexible tube 40 (FIG. 4). In particular, as illustrated in FIG. 4, the longitudinal axis X coincides with the longitudinal axis Y when the plugging portion 54 is inserted in the second free end 44.

The seat 56 also comprises a transversal bottom wall 59, opposite the transversal abutment wall 58, and a longitudinal connection wall 57 between the transversal abutment wall 58 and the transversal bottom wall 59. The longitudinal wall 57 comprises a substantially flat support surface 57a for the enlarged head 62 of the mounting cable 60.

The transversal bottom wall 59 comprises a substantially flat surface 59a, facing towards the transversal abutment wall 58 and inclined towards it.

The transversal bottom wall 59 comprises a substantially flat surface 59b, opposite the substantially flat surface 59a; the plugging portion 54 projects from the surface 59b.

Preferably, the substantially flat surface 59a is inclined with respect to the longitudinal axis X by an angle comprised between 5° and 40°, including extreme values.

The plugging portion 54 comprises a plurality of substantially circumferential indentations 54a.

A cross section of the plugging portion 54 (FIG. 4) shows that the indentations 54a form a sawtooth-shaped longitudinal profile 54b, which allows the insertion of the plugging portion 54 in the second free end 44 of the flexible tube 40 and opposes the disinsertion thereof, impeding it below a predetermined extraction force.

The sawtooth-shaped longitudinal profile 54b of the plugging portion 54 further ensures an adequate hydraulic seal, thanks to the fact that the indentations 54a are circumferential.

Figure 6:
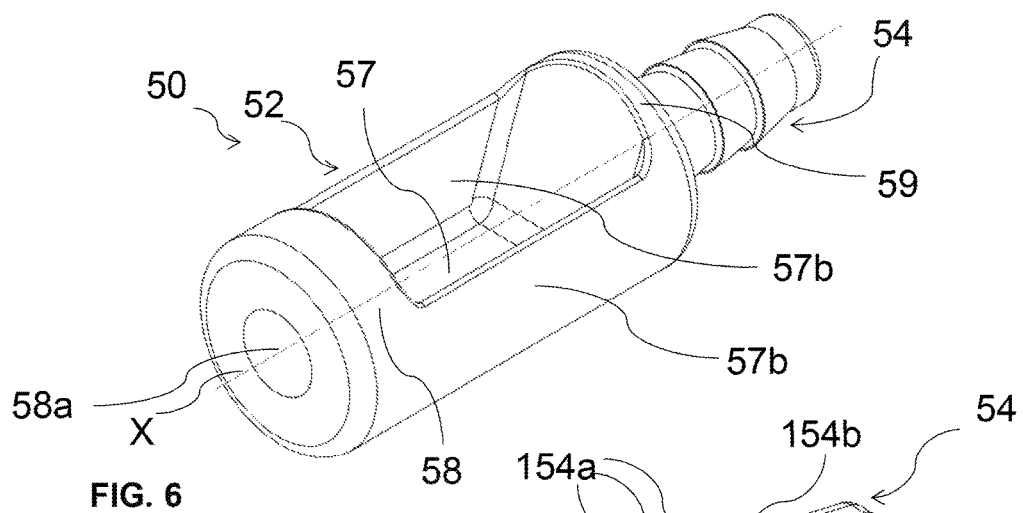
FIG. 6 is a perspective view of a second embodiment of a mounting tool according to the present invention.

FIG. 6 shows a second embodiment of a mounting tool 50 according to the present invention.

Elements of the mounting tool 50 of FIG. 6 analogous or functionally equivalent to those of the mounting tool 50 of FIGS. 2-5 are indicated with the same reference numeral and for their description we refer to what has been disclosed above.

The mounting tool 50 of this second embodiment of the invention differs from the mounting tool 50 described above substantially in that it comprises two opposite longitudinal side walls 57b that depart from the longitudinal wall 57 and connect the transversal walls 58 and 59 on the two sides of the mounting tool 50.

Figure 7:
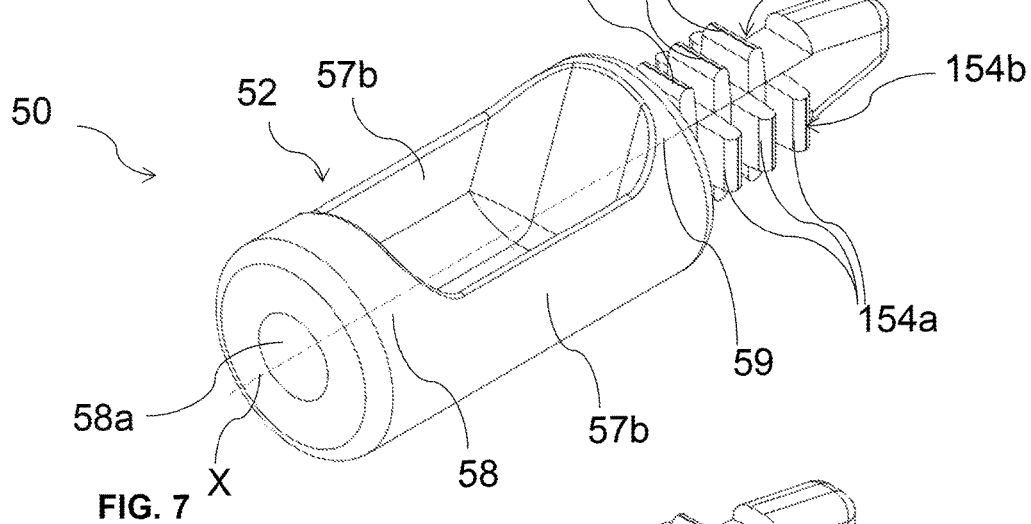
FIG. 7 is a perspective view of a third embodiment of a mounting tool according to the present invention.

FIG. 7 shows a third embodiment of a mounting tool 50 according to the present invention.

Elements of the mounting tool 50 of FIG. 7 analogous or functionally equivalent to those of the mounting tool 50 of FIGS. 2-6 are indicated with the same reference numeral and for their description we refer to what has been disclosed above.

The mounting tool 50 of this third embodiment of the invention differs from the mounting tool 50 of the second embodiment of FIG. 6 substantially by the shape of the plugging portion 54.

In particular, the plugging portion 54 of FIG. 7 comprises a plurality of substantially radial sectors 154a.

The sectors 154a are arranged in series and are spaced apart one another. The sectors 154a are grouped in mutually staggered groups 154b. In the example of FIG. 7, there are four groups 154b of sectors 154a, staggered from one another by about 90°.

The sectors 154a allow the insertion of the plugging portion 54 in the second free end 44 of the flexible tube 40 and oppose the disinsertion thereof, below a predetermined extraction force.

The sectors 154a of the plugging portion 54 ensure an excellent mechanical seal, but they do not ensure the hydraulic seal, which is thus entrusted to just the end coupling between the transversal wall 59 and the flexible tube 40.

Figure 8:
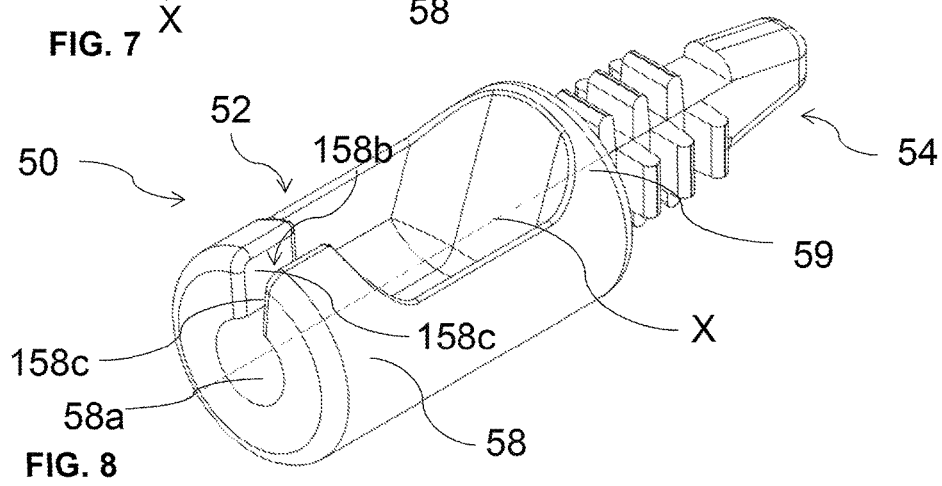
FIG. 8 is a perspective view of a fourth embodiment of a mounting tool according to the present invention.

FIG. 8 shows a fourth embodiment of a mounting tool 50 according to the present invention.

Elements of the mounting tool 50 of FIG. 8 analogous or functionally equivalent to those of the mounting tool 50 of FIGS. 2-7 are indicated with the same reference numeral and for their description we refer to what has been disclosed above.

The mounting tool 50 of this fourth embodiment of the invention differs from the mounting tool 50 of the third embodiment of FIG. 7 substantially in that the transversal abutment wall 58 comprises a substantially radial through slit 158b that departs from the through hole 58a of the transversal abutment wall 58. The through slit 158b has dimensions such as to be able to be passed through by the mounting cable 60.

Opposite walls 158c define the through slit 158b. The walls 158c are substantially flat and are mutually divergent, when moving away from the longitudinal axis X of the through hole 58a.

The distance along the axis X between the transversal abutment wall 58 and the transversal bottom wall 59 of the mounting tool 50 of FIG. 8 is shorter than the corresponding distance of the mounting tool 50 of FIG. 7, due to the fact that the mounting cable 60 can be inserted transversally in the through slit 158b, until the enlarged head 62 arrive at being housed in the seat 56. Therefore, a smaller axial space is necessary, with respect to the embodiment of FIG. 7 (and to the embodiments of the previous figures), wherein the mounting cable 60 is inserted longitudinally in the through hole 58a of the transversal abutment wall 58, until the enlarged head 62 arrives at being housed in the seat 56.

Figure 9:
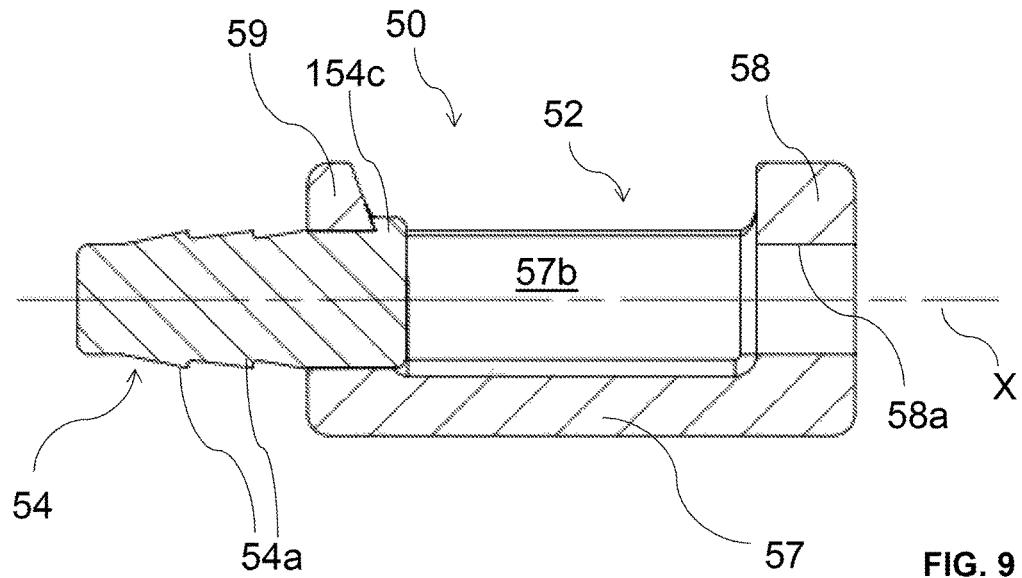
FIG. 9 is a longitudinal section of a fifth embodiment of a mounting tool according to the present invention.
Figure 10:
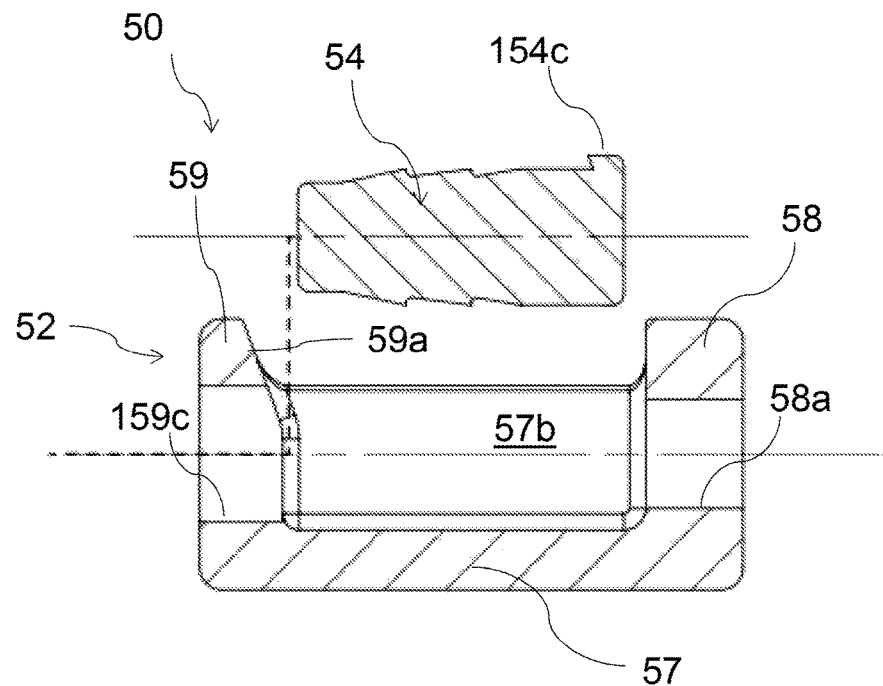
FIG. 10 is an exploded longitudinal section of the mounting tool of FIG. 9.

FIGS. 9 and 10 show a fifth embodiment of a mounting tool 50 according to the present invention.

Elements of the mounting tool 50 of FIGS. 9 and 10 analogous or functionally equivalent to those of the mounting tool 50 of FIGS. 2-8 are indicated with the same reference numeral and for their description we refer to what has been disclosed above.

The mounting tool 50 of this fifth embodiment of the invention differs from the mounting tool 50 of the second embodiment of FIG. 6 substantially in that the coupling portion 52 is made on a portion of the mounting tool 50 separable from another portion of the mounting tool 50 where the plugging portion 54 is made. In the previous embodiments, instead, the coupling portion 52 and the plugging portion 54 are made in a single piece.

In particular, the transversal bottom wall 59 of the mounting tool 50 of FIGS. 9 and 10 comprises a through hole 159c, which is passed through by the plugging portion 54 provided with an enlarged head 154c, which goes into abutment at the surface 59a of the transversal bottom wall 59.

Figure 19:
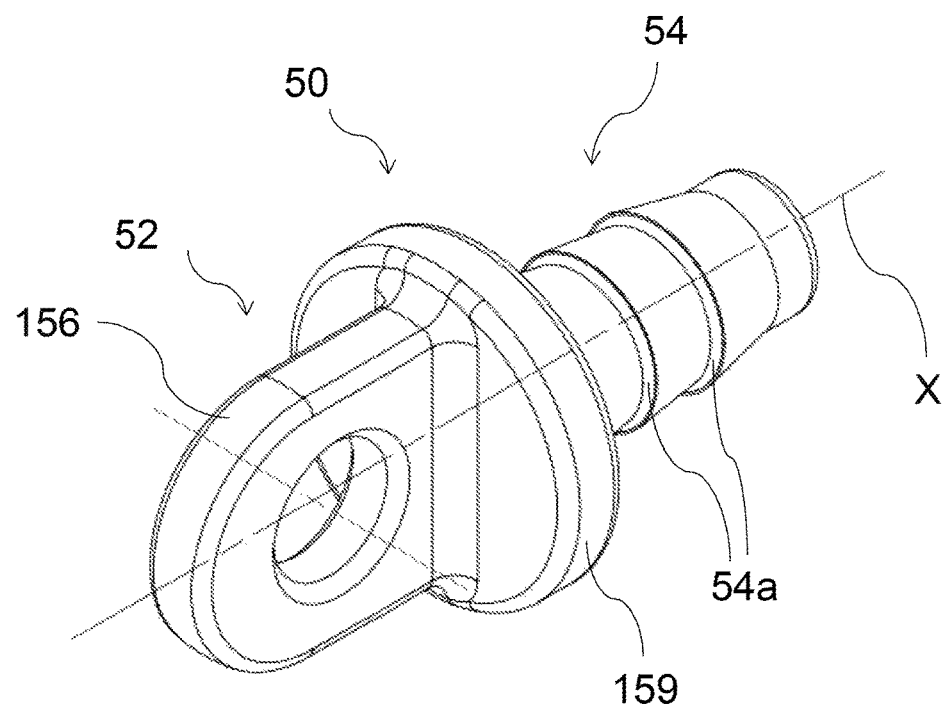
FIG. 19 is a perspective view of a sixth embodiment of a mounting tool according to the present invention, which can be mounted on a flexible tube of the hydraulic braking apparatus of FIG. 2 or 3.
Figure 20:
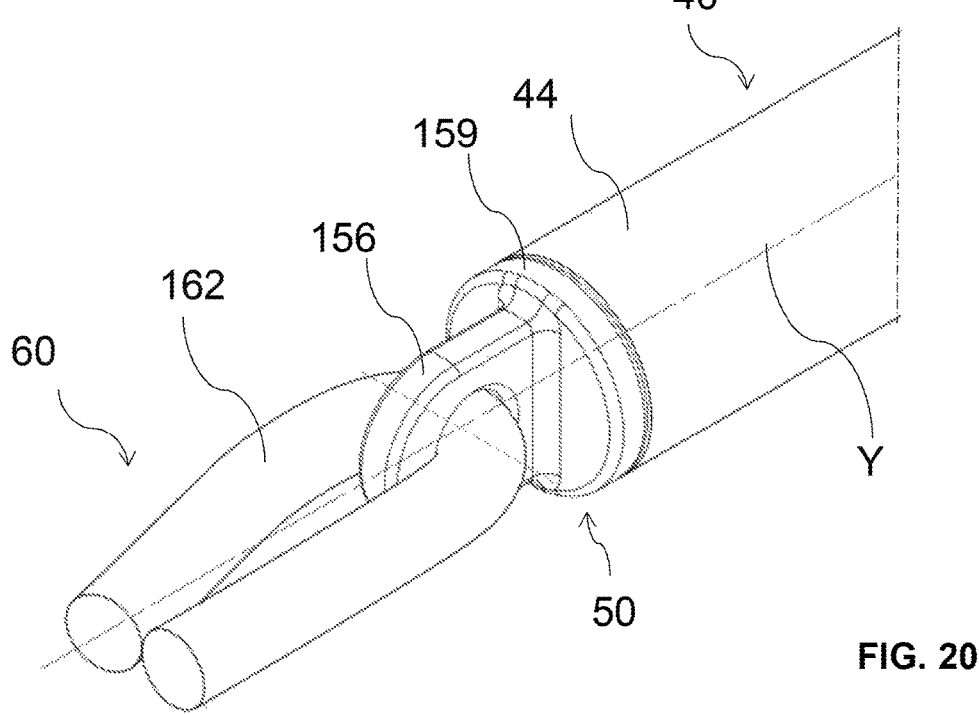
FIG. 20 is a perspective view of the mounting tool of FIG. 19.

FIGS. 19 and 20 show a sixth embodiment of a mounting tool 50 according to the present invention.

Elements of the mounting tool 50 of FIGS. 19 and 20 analogous or functionally equivalent to those of the mounting tool 50 of FIGS. 2-10 are indicated with the same reference numeral and for their description we refer to what has been disclosed above.

The mounting tool 50 of this sixth embodiment of the invention differs from the mounting tool 50 of the other embodiments in that the coupling portion 52 comprises— instead of the seat for the coupling to an enlarged head of the cable—a ring 156, formed projecting from a transversal wall 159 and configured for receiving a portion 162 of the mounting cable 60, inserted in the ring 156 and folded on itself.

This sixth embodiment of the mounting tool 50 does not require that the cable 60 has an enlarged head and therefore allows a simple cable 60 to be used.

Figure 3:
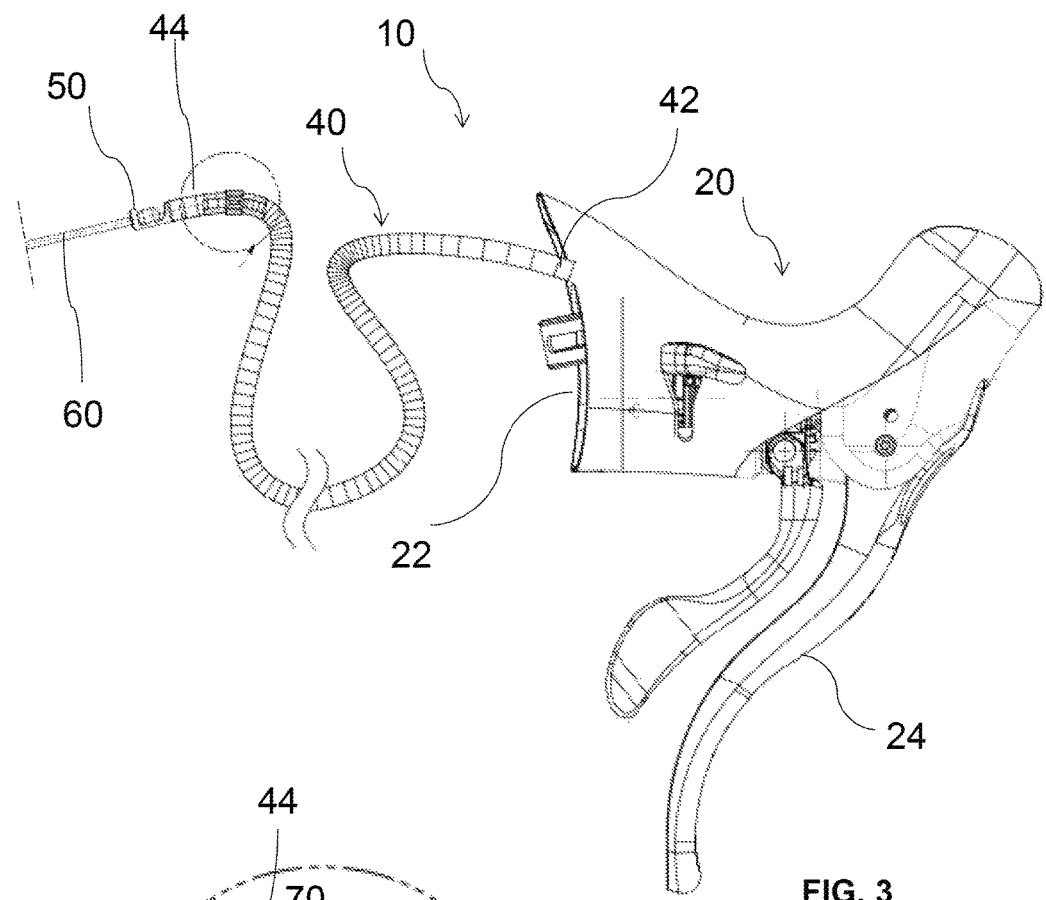
FIG. 3 is a view of a front portion (including a control member and a flexible tube) of a second embodiment of a hydraulic braking apparatus according to the present invention, to be mounted on the bicycle frame of FIG. 1.
Figure 3A:
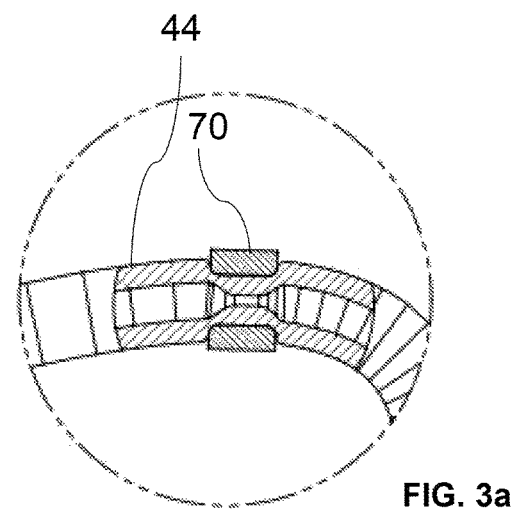
FIG. 3a is an enlargement of a part of the hydraulic braking apparatus that is circled in FIG. 3.

FIGS. 3 and 3a show a second embodiment of a hydraulic braking apparatus 10 according to the present invention.

Components of the hydraulic braking apparatus 10 of FIGS. 3 and 3a analogous or functionally equivalent to those of the hydraulic braking apparatus 10 of FIGS. 2 and 2a are indicated with the same reference numeral and for their description we refer to what has been disclosed above.

The hydraulic braking apparatus 10 of this second embodiment of the invention differs from the hydraulic braking apparatus 10 of the first embodiment of FIGS. 2 and 2a substantially in that it provides a ring-shaped clamp 70 that is arranged in proximity of the second free end 44 of the flexible tube 40 and throttles the flexible tube 40, so as to avoid losses of braking liquid in case of an accidental actuation of the brake lever 24 before the mounting is complete.

As illustrated in FIG. 3a, the ring-shaped clamp 70 has a transversal bulk slightly greater than that of the flexible tube 40.

Figure 11:
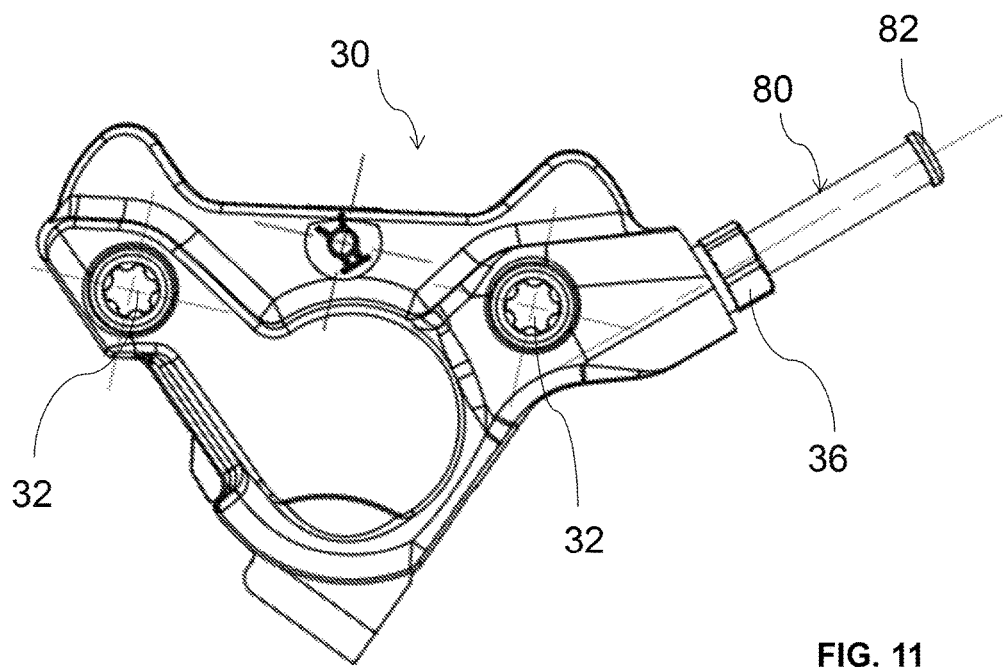
FIG. 11 is a side view of a rear portion (including a braking member) of the first or second embodiment of the hydraulic braking apparatus according to the present invention of FIG. 2 or 3, to be mounted on the bicycle frame of FIG. 1.
Figure 12:
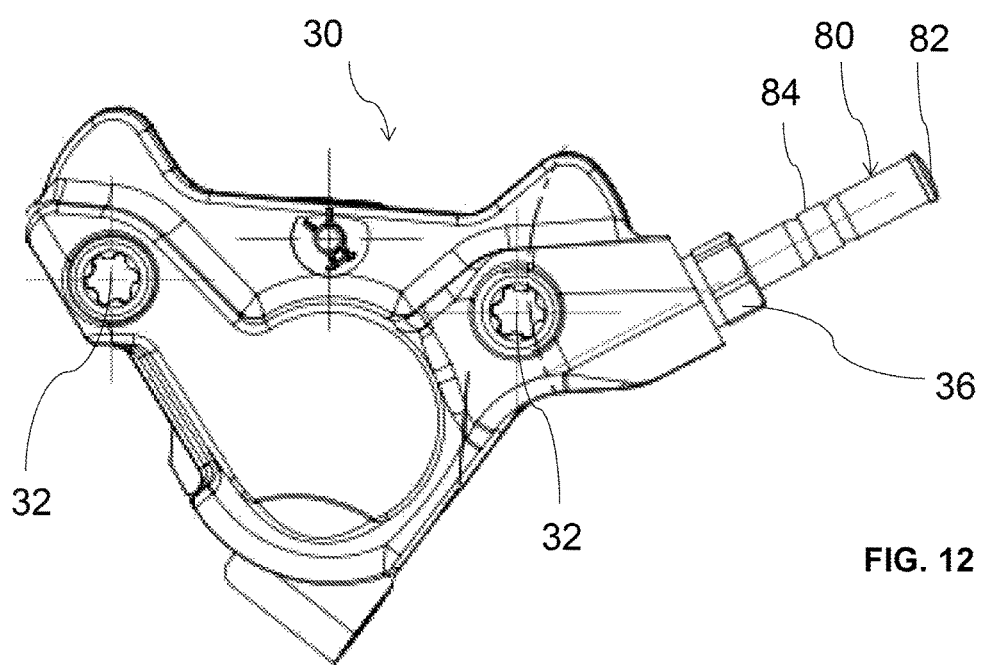
FIG. 12 is a side view of a variant of the rear portion (including a braking member) of the first or second embodiment of the hydraulic braking apparatus according to the present invention of FIG. 2 or 3, to be mounted on the bicycle frame of FIG. 1.
Figure 15:
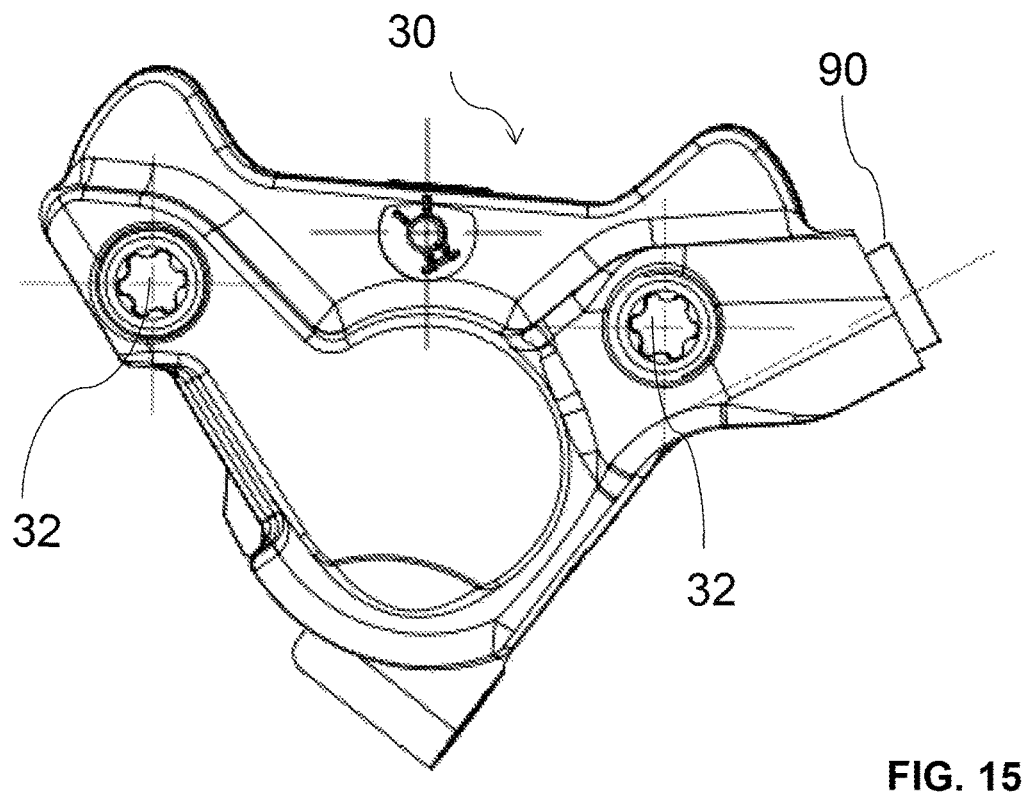
FIG. 15 is a side view of a further variant of the rear portion (including a braking member) of the first or second embodiment of the hydraulic braking apparatus according to the present invention of FIG. 2 or 3, to be mounted on the bicycle frame of FIG. 1.

FIGS. 11, 12 and 15 illustrate three embodiments of a rear portion (namely a portion including the braking member 30) of the first or second embodiment of the hydraulic braking apparatus 10 according to the present invention of FIG. 2 or 3, to be mounted on the bicycle frame 100 (or on a fork, in case of front brake).

Figure 13:
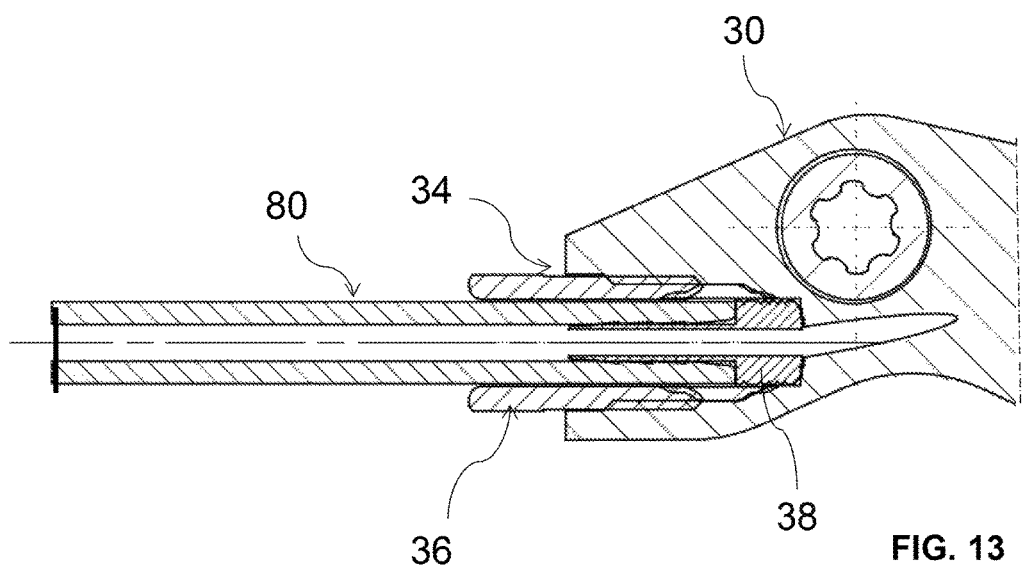
FIG. 13 is a longitudinal section of a detail of the hydraulic braking apparatus of FIG. 11, without closing plug.
Figure 14:
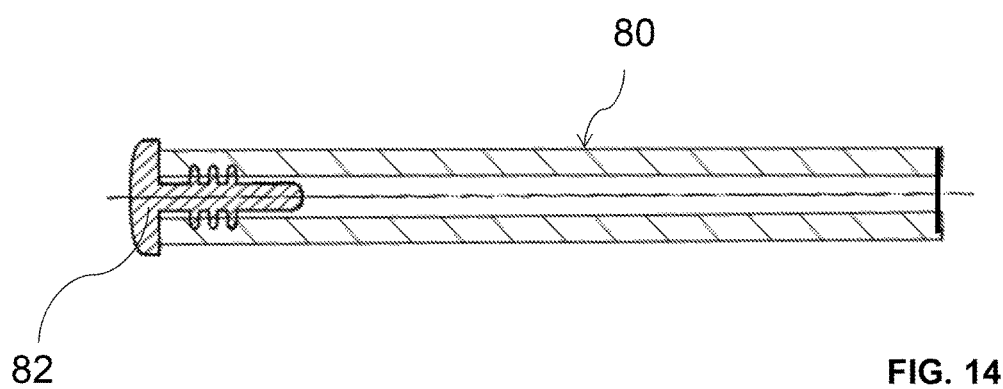
FIG. 14 is a longitudinal section of a detail of the hydraulic braking apparatus of FIG. 11.

In FIGS. 11 and 13, an inlet opening 34 of the braking member 30, which will have to be connected to the flexible tube 40 to complete the mounting of the hydraulic braking apparatus 10, is plugged through a piece of tube 80, provided with a closing plug 82 (FIGS. 11 and 14). The inlet opening 34 is in fluid communication with an inner chamber (not illustrated) of the braking member 30.

The inlet opening 34 is provided with a screw-tightening union 36 (per se known and not described in detail), wherein the piece of tube 80 is tightened before mounting. When mounting has taken place, the screw-tightening union 36 tightens the second free end 44 of the flexible tube 40.

As shown in FIG. 13, the inlet opening 34 is also provided with a bottom gasket 38 on which the piece of tube 80 and then the second free end 44 of the flexible tube 40 is inserted.

FIG. 12 shows a ring-shaped clamp 84 that is arranged on the piece of tube 80 and throttles the piece of tube 80, so as to avoid losses of braking liquid before mounting, if braking liquid has already been introduced in the braking member 30 and in the piece of tube 80 before the mounting is complete.

In the braking member 30 of FIG. 15 there is a plug 90 that closes the inlet opening 34 of the braking member 30.

The plug 90 comprises a plurality of substantially circumferential indentations 92.

The indentations 92 form a sawtooth-shaped longitudinal profile, which allows the insertion of the plug 90 in the inlet opening 34 and opposes the disinsertion thereof, below a predetermined extraction force.

The sawtooth-shaped longitudinal profile of the plug 90 also ensures an adequate hydraulic seal.

In FIGS. 11-15, the elements that are analogous or functionally equivalent are indicated with the same reference numeral and their description is carried out only once above.

Figure 16:
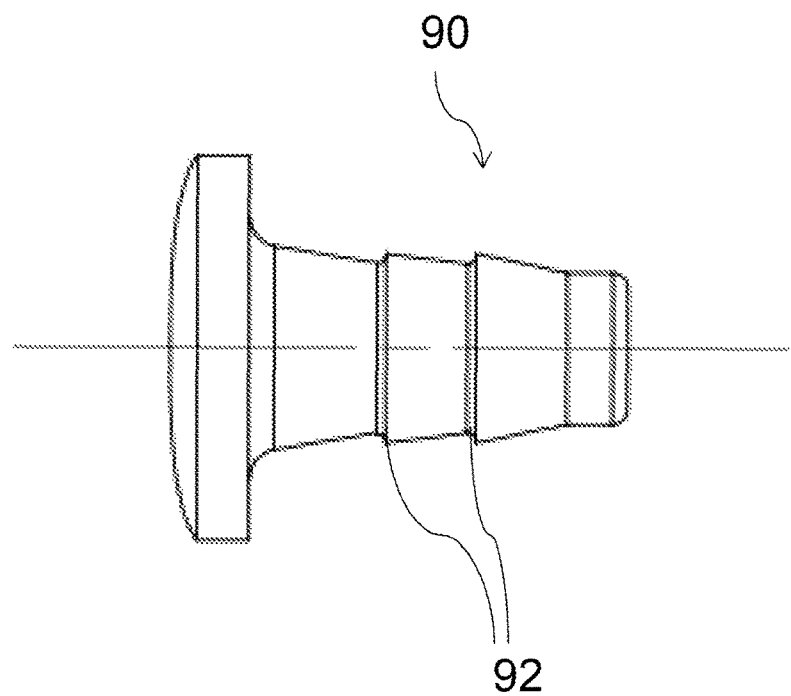
FIG. 16 is a side view of a detail of the hydraulic braking apparatus of FIG. 15.

In other words, in FIGS. 11-15 there is always a closing element to plug the inlet opening 34 of the braking member 30, which in FIGS. 11-14 is the piece of tube 80, plugged by the plug 82, whereas in FIGS. 15 and 16 it is the plug 90.

Figure 17:
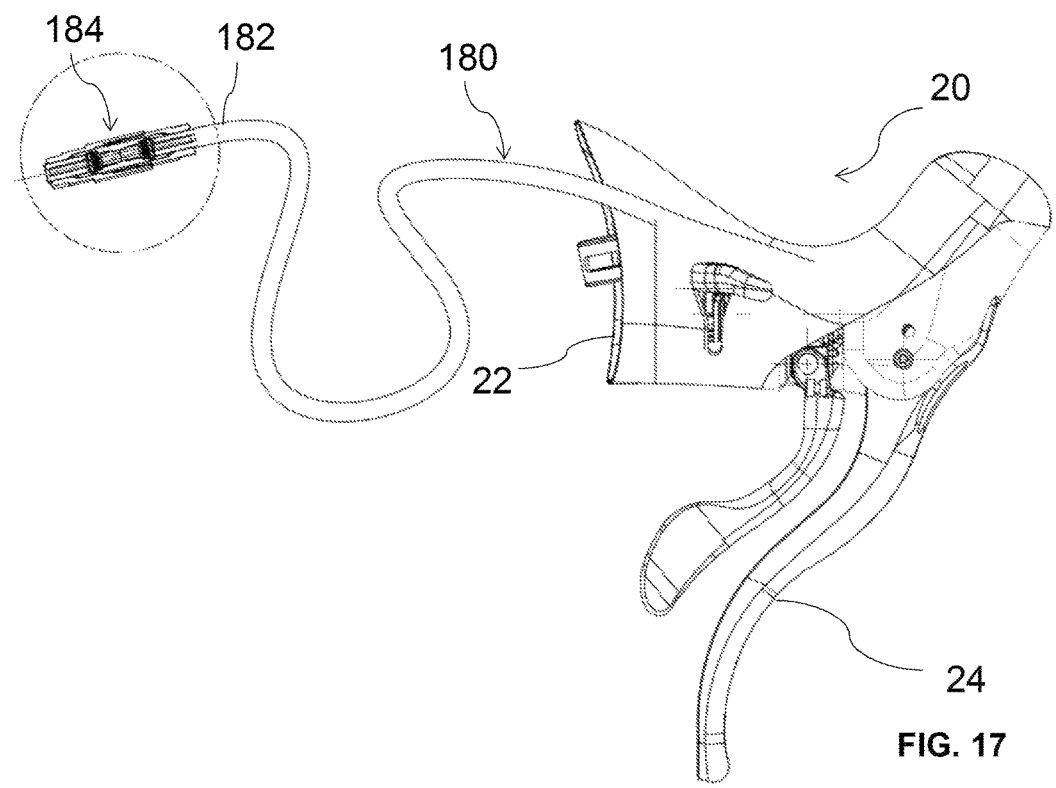
FIG. 17 is a view of a front portion (including a control member and a flexible tube) of a third embodiment of a hydraulic braking apparatus according to the present invention, to be mounted on the bicycle frame of FIG. 1.
Figure 18:
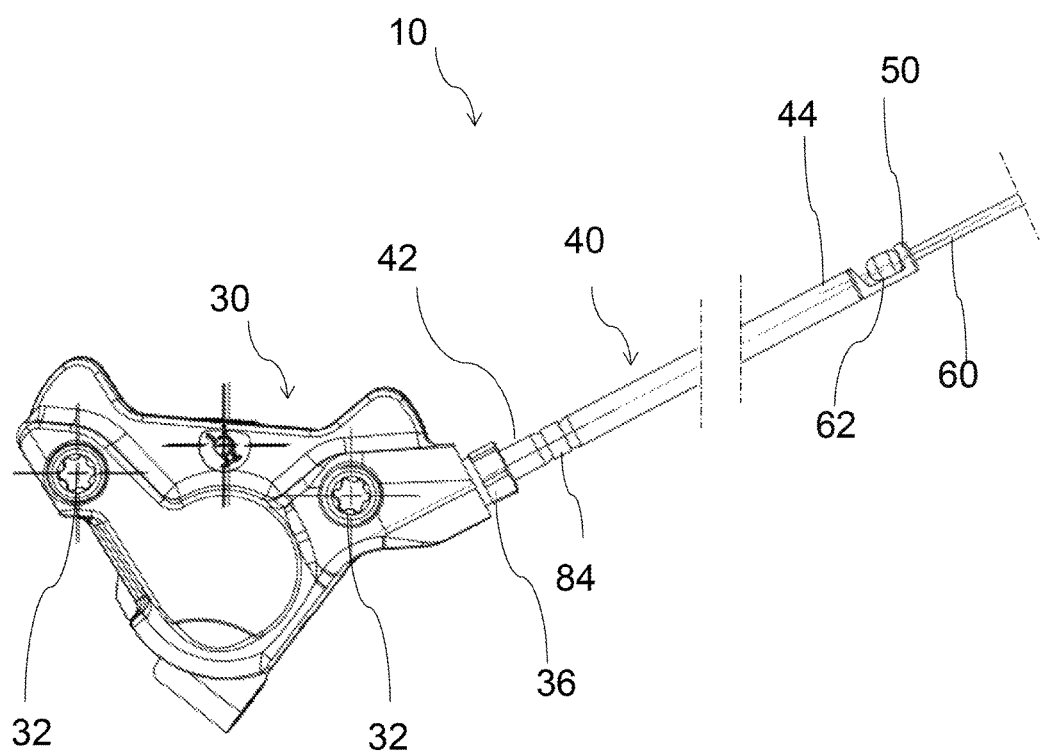
FIG. 18 is a side view of a rear portion (including a braking member) of the third embodiment of the hydraulic braking apparatus according to the present invention of FIGS. 17 and 17a, to be mounted on the bicycle frame of FIG. 1.

FIGS. 17 and 18 illustrate a third embodiment of a hydraulic braking apparatus 10 according to the present invention.

Components of the hydraulic braking apparatus 10 of FIGS. 17 and 18 analogous or functionally equivalent to those of the hydraulic braking apparatus 10 of the previous figures are indicated with the same reference numeral and for their description we refer to what has been disclosed above.

The hydraulic braking apparatus 10 of this third embodiment of the invention differs from the hydraulic braking apparatus 10 of the first or second embodiment of the previous figures substantially in that, as illustrated in FIG. 18, a first free end 42 of the flexible tube 40 is connected to the braking member 30, whereas an opposite second free end 44 of the flexible tube 40 is connected to a mounting tool 50.

FIG. 18 shows a ring-shaped clamp 84 that is arranged in proximity of the free end 42 of the flexible tube 40 and throttles the flexible tube 40, so as to avoid losses of braking liquid before the mounting is complete.

Figure 17A:
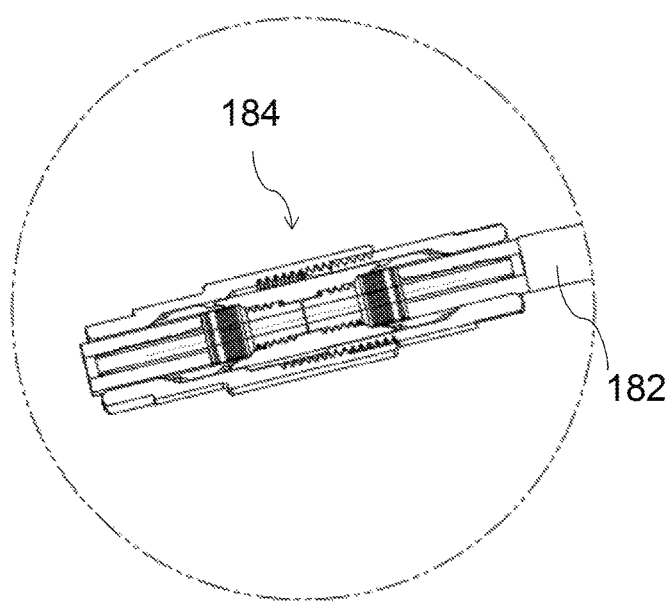
FIG. 17a is an enlargement of a part of the hydraulic braking apparatus that is circled in FIG. 17.

As can be seen in FIGS. 17 and 17*a*, a second flexible tube 180 is connected to the control member 20. A free end 182 of the second flexible tube 180 is provided with a screw-tightening union 184 (per se known and not described in detail), in which—when mounting is complete—the second free end 44 of the flexible tube 40 is tightened.

The mounting of the hydraulic braking apparatus 10 on the bearing element (frame 100) of bicycle will now be described, which depends on the initial conditions of the apparatus itself.

Initially, the braking apparatus 10 is as shown in FIG. 2, with the flexible tube 40 connected to the control member 20 and with this latter provided with the mounting tool 50. In the control member 20 and in the flexible tube 40 there is already the braking liquid, which cannot come out thanks to the plugging portion 54 of the mounting tool 50. The braking member 30 is as shown in FIG. 11, and can also be already provided with braking liquid, held by the plug 82 on the piece of tube 80.

The control member 20 can be immediately fixed to the bicycle handlebars, just as the braking member 30 can be immediately fixed to the bearing element of the bicycle (the frame 100, in case of rear brake). It is also possible to carry out one or both of these mountings at a later time.

Then the mounting cable 60 is predisposed, inserting it through the hole 58*a* so that the enlarged head 62 abuts in the seat 56, against the transversal wall 58.

The mounting cable 60 is then inserted in the internal cavity 102, through the inlet opening 104, and is driven in the internal cavity 102 until it comes out from the outlet opening 106.

Once it has come out from the outlet opening, the mounting cable 60 is pulled so as to drag the mounting tool 50 and with it the flexible tube 40. Consequently, the flexible tube 40 is driven through the inlet opening 104, passes through the internal cavity 102 and comes out from the outlet opening 106.

It is now possible to remove the mounting tool 50 from the second free end 44 of the flexible tube 40, furthermore taking care not to let the braking liquid escape (if present); for this purpose, it is possible to keep the end 44 raised and facing upwards, or it is possible to throttle the tube 40, with the hands or with a tool such as a caliper or similar. Moreover, the braking member 30 is predisposed for the connection with the free end 44 of the tube 40, removing the piece of tube 80. If the braking member 30 has also been previously filled with braking liquid, it is suitable to direct the inlet opening 34 upwards. In the case in which the length of the tube 40 is excessive for the specific bicycle on which the braking apparatus 10 is mounted, the excess portion is now cut.

At this point, the end 44 of the tube 40 is connected to the braking member 30. In this entire series of operations it is possible for air to enter into the braking apparatus 10; in this case, it is thus suitable to bleed the air, in a per se known and conventional manner, using an opening or bleed valve (not illustrated) typically provided in the control member 20. Equally, it will be necessary to bleed air and possibly load braking liquid in the case in which the braking member 30 and/or the flexible tube 40 and/or the control member 20 have not been previously filled with braking liquid.

Preferably, it can be made easier to pass the mounting cable 60 in the internal cavity 102 between the inlet opening 104 and the outlet opening 106 with the help of a guide tube (not illustrated). The guide tube is arranged in advance in the internal cavity 102 between the inlet opening 104 and the outlet opening 106, for example during the manufacturing of the bearing element such as the frame 100.

In the case in which the braking apparatus 10 is the one shown in FIG. 3, the clamp 70 facilitates the final connection step of the tube 40 to the braking member 30, blocking any possible escape of braking liquid from the tube 40. Clearly, the clamp 70 is removed, after the tube 40 has been connected to the braking member 30.

In the case in which the mounting tool 50 is the one shown in FIG. 8, the through slit 158*b* allows an easier positioning of the mounting cable 60 on the mounting tool 50. Indeed, it is not necessary to insert and pass the entire mounting cable 60 through the hole 58*a*, but rather it is sufficient to insert the mounting cable 60 laterally in the seat 56, in proximity of the enlarged head 62. In this way, the length in axial direction of the seat 56 can be lower, with respect to that of the tool 50 without radial slit (FIG. 4-7), because it is sufficient that there is a minimum maneuvering space for the enlarged head 62. The shorter length of the mounting tool 50 facilitates the step in which the tube 40—pulled by the mounting cable 60—passes through the internal cavity 102.

In the case in which the braking member 30 is the one shown in FIG. 12, the clamp 84 facilitates the final connection step of the tube 40 to the braking member 30, blocking any possible escape of braking liquid from the braking member 30. Clearly, the clamp 84 is removed, after the tube 40 has been connected to the braking member 30.

In the case in which the braking member 30 is the one shown in FIG. 18, it is necessary for the control member 20 to be as shown in FIG. 17. In this case, the flexible tube 40 (previously connected to the braking member 30 instead of to the control member 20), is arranged inside the internal cavity 102 with an operation similar to the one already described, wherein however the passage takes place from the outlet opening 106 to the inlet opening 104. At the end, then, the flexible tube 40 is connected to the flexible tube 180 through the union 184.

Of course, those skilled in the art can bring numerous modifications and variants to the method for mounting a hydraulic braking apparatus on a bicycle, to the hydraulic braking apparatus and to the mounting tool according to the present invention, in order to satisfy specific and contingent requirements. In particular, the features of the different embodiments of the invention can be combined with each other, even beyond what is explicitly illustrated.

What is claimed is:

1. A method for mounting a hydraulic braking apparatus on a bicycle, said hydraulic braking apparatus comprising: a control member, a braking member and a flexible tube for adducing braking liquid between said control member and said braking member, the bicycle comprising a bearing element with an internal cavity provided with an inlet opening and with an outlet opening for said flexible tube, said method comprising:
   a) fixing said control member to bicycle handlebars;
   b) fixing said braking member to said bearing element of bicycle;
   c) connecting a first free end of said flexible tube to one between said control member and said braking member;

d) connecting an opposite second free end of said flexible tube to a mounting tool;
e) providing a mounting cable;
f) coupling the mounting cable to said mounting tool connected to said flexible tube;
g) making said mounting cable pass through the internal cavity of said bearing element between said inlet opening and said outlet opening;
h) pulling said mounting cable, so as to drag said flexible tube through the internal cavity of said bearing element between said inlet opening and said outlet opening;
i) removing said mounting tool from said second free end of said flexible tube;
j) connecting said second free end of said flexible tube to the other between said control member and said braking member.

2. The method according to claim 1, comprising the further step of:
k) filling said flexible tube and an inner chamber of said one between said control member and said braking member with braking liquid, wherein the step k) is carried out after said step c) and before said step d).

3. The method according to claim 1, comprising the following further steps:
l) filling an inner chamber of said other between said control member and said braking member with braking liquid;
m) thereafter, plugging said inner chamber of said other between said control member and said braking member through a closing element;
n) thereafter, removing said closing element and carrying out said step j).

4. A hydraulic braking apparatus to be mounted on a bicycle, said hydraulic braking apparatus comprising:
a control member,
a braking member and
a flexible tube for adducing braking liquid between said control member and said braking member,
said control member comprising a fixing portion to bicycle handlebars,
said braking member comprising fixing members to a bearing element of the bicycle, wherein a first free end of said flexible tube is connected to one between said control member and said braking member, and an opposite second free end of said flexible tube is connected to a mounting tool,
said mounting tool comprising a coupling portion to a mounting cable and a plugging portion inserted in said flexible tube, wherein said mounting tool has a transversal cross section no greater than a transversal cross section of said flexible tube.

5. The hydraulic braking apparatus according to claim 4, further comprising a closing element to plug an inner chamber of the other between said control member and said braking member.

6. The hydraulic braking apparatus according to claim 4, further comprising braking liquid pre-inserted in the flexible tube and in one or both of the control and braking members.

7. A mounting tool for mounting a hydraulic braking apparatus on a bicycle, the mounting tool comprising:
a coupling portion for a mounting cable, the coupling portion including a seat configured for housing an enlarged head of said mounting cable, and
a plugging portion that has a plurality of substantially radial sectors and is configured for the insertion in a free end of a flexible tube of said hydraulic braking apparatus, the plugging portion including a plurality of circumferential indentations that are axially spaced from each other.

8. The mounting tool according to claim 7, wherein said seat comprises a transversal abutment wall for the enlarged head of said mounting cable, said transversal abutment wall comprising a through hole configured for being passed through by said mounting cable.

9. The mounting tool according to claim 8, wherein said transversal abutment wall comprises a substantially radial through slit, configured for being passed through by said mounting cable.

10. The mounting tool according to claim 7, wherein said coupling portion of said mounting tool comprises a ring configured for coupling said mounting cable.

11. The mounting tool according to claim 7, wherein said coupling portion is made on a portion of said mounting tool separable from another portion of said mounting tool where said plugging portion is made.

* * * * *